No. 828,933. PATENTED AUG. 21, 1906.
C. W. DAKE.
ELASTIC FLUID TURBINE.
APPLICATION FILED NOV. 29, 1905.
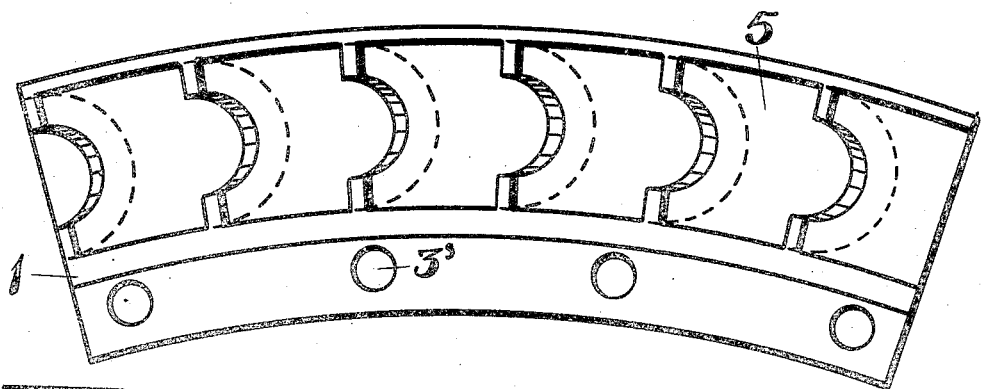
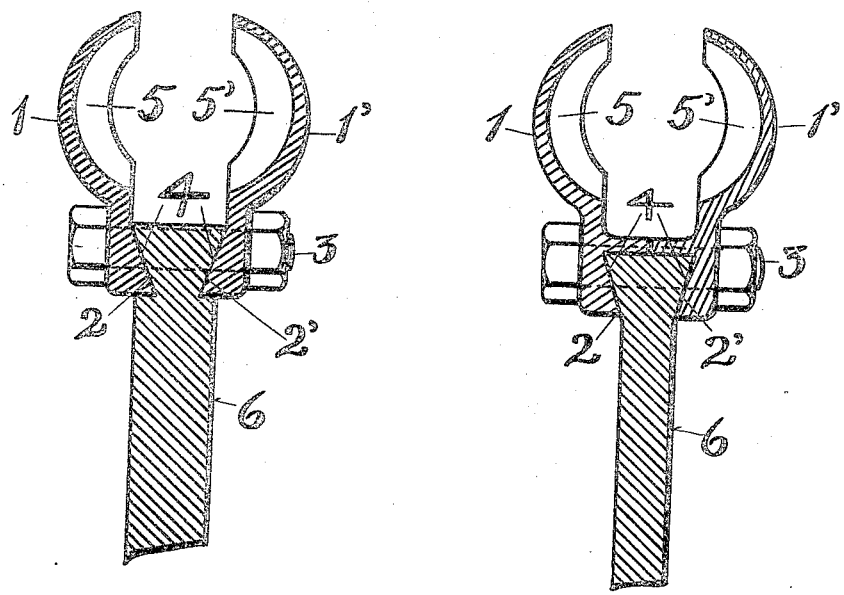
WITNESSES:
INVENTOR
ATTORNEYS

UNITED STATES PATENT OFFICE.

CHARLES W. DAKE, OF GRAND RAPIDS, MICHIGAN.

ELASTIC-FLUID TURBINE.

No. 828,933.  Specification of Letters Patent.  Patented Aug. 21, 1906.

Application filed November 29, 1905. Serial No. 289,656.

*To all whom it may concern:*

Be it known that I, CHARLES W. DAKE, a citizen of the United States, residing at the city of Grand Rapids, county of Kent, State of Michigan, have invented certain new and useful Improvements in Elastic-Fluid Turbines, of which the following is a specification.

This invention relates to improvements in elastic-fluid turbines, and more particularly to improvements in turbine-wheels with sectional buckets and the means of retaining such sectional buckets in position.

The object of this invention is to provide a means of securing the sectional buckets in place, which will when the parts are tightened positively secure them in their required position for operation, the sections and disk being of such shape that the various sections can be readily formed and forced into position.

Minor objects and objects relating to the details of construction will definitely appear from the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1 is one of the bucket-segments for my improved turbine-wheel. Fig. 2 is a cross-sectional detail view through the segments and a portion of the wheel-web of my preferred construction, and Fig. 3 is a similar detail illustration of a modified form of the structure.

In the drawings similar numerals of reference refer to similar parts throughout the several views.

The wheel-web 6 is of course circular in form. The periphery of this is of dovetail form, it being possible to readily turn the same into this shape in any suitable lathe.

The buckets 5 are semicircular pockets and are cut obliquely into the segments 1 and 1' for receiving the jets and turning them backwardly. The shank of each segment is preferably formed with a shoulder to fit against and embrace the periphery of the wheel-web. The projecting parts forming the shoulders on the opposite segments are slightly separated from each other and are not of sufficient width to contact with each other around the periphery of the web.

Transverse bolts extend through suitable holes 3' and clamp the segments to the opposite sides of the wheel-web. When the bolts are drawn tight, the parts wedge down onto the dovetailed portion and fit securely into place.

In place of forming the shoulders in the segments 1 and 1' they may be formed in the sides of the wheel-web 6, as appears in Fig. 3, when the clamping of the bolt will draw the lower ends of the shanks of the segments securely into place against these shoulders, anchoring and supporting the segments in proper relation to the turbine. Of course this method of fastening can be used with other styles of buckets or vanes without departing from my invention.

The details of my structure can be modified without departing therefrom.

Having thus described my invention, what I claim as new, and desire to secure by Letters Patent, is—

1. The combination with a wheel-web with its periphery of dovetailed form of bucket-segments with shanks conforming to the dovetailed portion with shoulders to locate the same; and transverse bolts through the shanks and dovetailed portion for drawing the said shanks securely against the dovetailed portion to properly clamp the same.

2. In an elastic-fluid turbine, the combination of a wheel-web with its periphery of dovetailed form; bucket-segments with shanks conformed to the dovetailed portion, the said parts being shouldered together; and means for clamping the shanks onto the opposite sides of the wheel-web against the sides of the dovetail, for the purpose specified.

In witness whereof I have hereunto set my hand and seal in the presence of two witnesses.

CHARLES W. DAKE. [L. S.]

Witnesses:
ADELAIDE J. ADAMS,
OTIS A. EARL.